(12) United States Patent  
Koepke

(10) Patent No.: US 8,335,292 B2
(45) Date of Patent: Dec. 18, 2012

(54) JET PUMP DIFFUSER WELD REPAIR DEVICE AND METHOD

(75) Inventor: Barry Hal Koepke, Castle Rock, CO (US)

(73) Assignee: General Electric Company, Schenectady, NY (US)

( * ) Notice: Subject to any disclaimer, the term of this patent is extended or adjusted under 35 U.S.C. 154(b) by 1357 days.

(21) Appl. No.: 11/583,062

(22) Filed: Oct. 19, 2006

(65) Prior Publication Data

US 2008/0107227 A1    May 8, 2008

(51) Int. Cl.
 *G21C 9/00* (2006.01)
(52) U.S. Cl. ....................................................... 376/277
(58) Field of Classification Search .................. None
 See application file for complete search history.

(56) References Cited

U.S. PATENT DOCUMENTS

| | | | |
|---|---|---|---|
| 3,144,165 A * | 8/1964 | Pegon et al. | 220/211 |
| 4,709,729 A * | 12/1987 | Harrison | 138/99 |
| 5,392,322 A | 2/1995 | Whitling et al. | |
| 5,737,380 A | 4/1998 | Deaver et al. | |
| 5,802,129 A | 9/1998 | Deaver et al. | |
| 5,805,652 A | 9/1998 | Gleason et al. | |
| 5,876,146 A * | 3/1999 | Deaver et al. | 403/11 |
| 5,901,192 A | 5/1999 | Deaver et al. | |
| 5,964,029 A * | 10/1999 | Weems et al. | 29/723 |
| 6,053,652 A | 4/2000 | Deaver et al. | |
| 6,086,120 A | 7/2000 | Deaver et al. | |
| 6,108,391 A * | 8/2000 | Deaver et al. | 376/262 |
| 6,343,107 B1 | 1/2002 | Erbes et al. | |
| 2007/0189434 A1* | 8/2007 | Jensen | 376/260 |

* cited by examiner

*Primary Examiner* — Jack W Keith
*Assistant Examiner* — Marshall O'Connor
(74) *Attorney, Agent, or Firm* — Nixon & Vanderhye P.C.

(57) ABSTRACT

A jet pump diffuser weld repair device includes a lower ring section and an upper ring section respectively sized to fit around a circumference of the diffuser on opposite sides of the weld to be repaired. The lower and upper ring sections are provided with a plurality of aligned gripper slots. A corresponding plurality of grippers are fit into the gripper slots, where at least one of the gripper slots and the grippers defines cam surfaces shaped to drive the grippers radially inward as lower and upper ring sections are drawn toward each other. A plurality of connector bolts are secured between the lower ring section and the upper ring section. Tightening of the connector bolts draws the lower and upper ring sections toward each other.

10 Claims, 5 Drawing Sheets

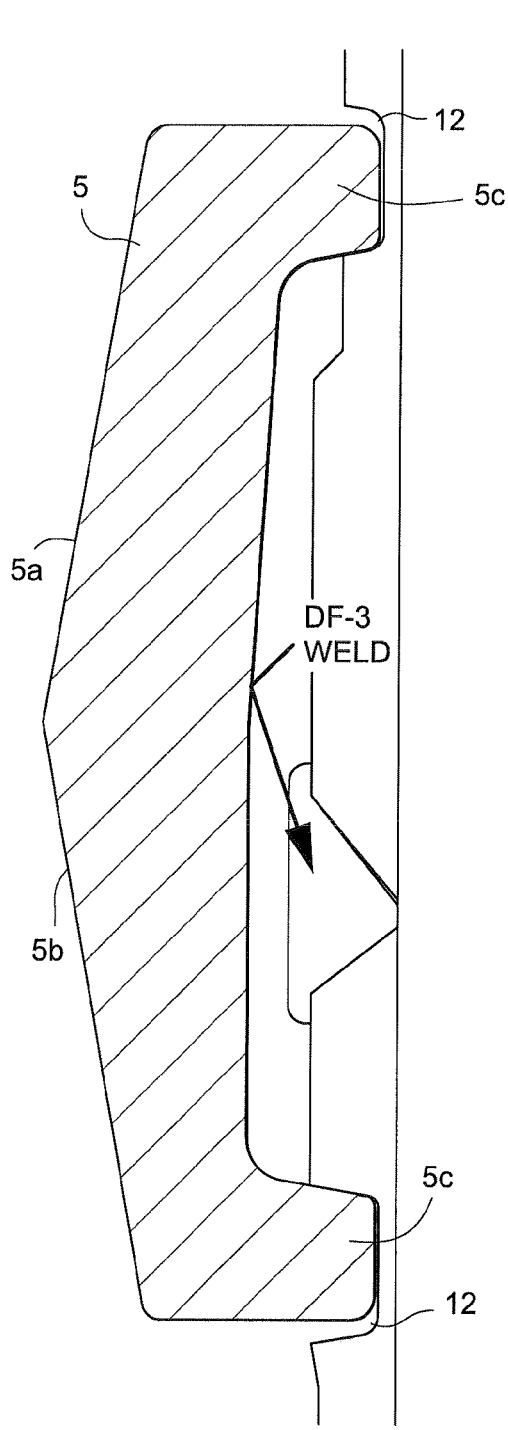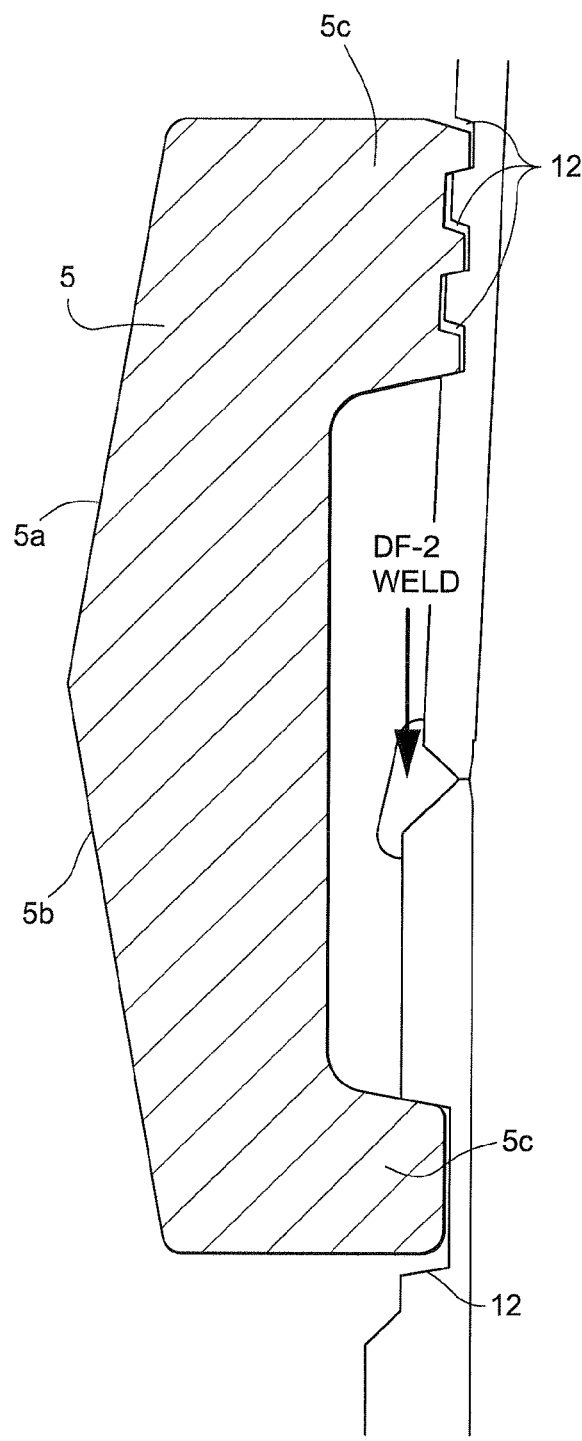
Fig. 5
DF-3 Weld Gripper Engagement
Fig. 6
DF-2 Weld Gripper Engagement

JET PUMP DIFFUSER WELD REPAIR DEVICE AND METHOD

BACKGROUND OF THE INVENTION

A remotely installable jet pump diffuser weld repair device structurally replaces cracked adapter or lower ring to tail pipe welds and the tail pipe to shell welds. The device is remotely installable in the limited space in the shroud to vessel annulus of boiling water reactor (BWR) power plants.

The jet pump assembly is part of the reactor recirculation system. Each assembly includes a riser assembly, a riser brace, two inlet-mixer assemblies, and two diffuser assemblies. Each assembly is installed in the annulus between the reactor pressure vessel (RPV) and the shroud. There are twenty jet pumps (ten jet pump assemblies) installed in a typical General Electric BWR. The riser assembly is welded to the reactor pressure vessel (RPV) at the riser brace location, and the recirculation inlet nozzle at the penetration. The two diffuser assemblies (DA) are welded to the shroud support plate (see FIG. 1).

The two inlet-mixer assemblies are removable components. The entrance end of each inlet-mixer assembly seats into the top of the riser transition piece. The exit end fits into a slip joint with the top of the diffuser assembly. Lateral support for the inlet-mixer is provided by the restrainer bracket, which is welded to the riser pipe. Two adjusting screws (set screws), each threaded into the restrainer bracket, and the inlet-mixer wedge provide three points of lateral support for the inlet-mixer. Lateral support for the riser assembly is provided by the riser brace.

Existing jet pump assembly components are fabricated from Type 304 stainless steel, with the exception of the diffuser lower ring, which is fabricated from Ni—Cr—Fe Alloy 600. The welds are designated DF-3 or DF-2 as shown in FIG. 1. Cracking attributed to Intergranular Stress Corrosion Cracking (IGSCC) has been observed at the Alloy 600 to stainless steel transition weld (DF-3) between the lower ring and tail pipe.

The postulated crack in a DF-3 or a DF-2 weld would detach the diffuser from the jet pump assembly, resulting in the total loss of the jet pump assembly. This could in turn result in failure of jet pump functionality in providing recirculation flow path to reactor core and loss of providing the 2/3-core height coverage in the event of LOCA accident. The failure of a jet pump assembly occurring during operation will cause a change in the monitored jet pump flow, which would be detected, allowing the plant to be brought to a safe shut down condition in accordance with plant technical specifications.

Jet pump diffuser weld cracks that have required repair have been a relatively recent occurrence. There has only been one other type of jet pump diffuser repair developed using a tie rod assembly. The scope of that repair was limited to hardware design and analysis and installation tooling concept design. Full scale mockup testing was not done. Repair clamps for welds in other tubular portions of the jet pump have been developed specifically for the thermal sleeve to elbow weld in the riser portion of the jet pump. U.S. Pat. Nos. 6,053,652, 6,108,391 and 6,086,120 relate to jet pump riser thermal sleeve to elbow weld repair.

BRIEF DESCRIPTION OF THE INVENTION

In an exemplary embodiment of the invention, a jet pump diffuser weld repair device includes a lower ring section and an upper ring section respectively sized to fit around a circumference of the diffuser on opposite sides of the weld to be repaired. The lower and upper ring sections are provided with a plurality of aligned gripper slots. A corresponding plurality of grippers are fit into the gripper slots, where at least one of the gripper slots and the grippers defines cam surfaces shaped to drive the grippers radially inward as the lower and upper ring sections are drawn toward each other. A plurality of connector bolts are secured between the lower ring section and the upper ring section. Tightening the connector bolts draws the lower and upper ring sections toward each other.

In another exemplary embodiment of the invention, a weld repair device for a thin wall welded pipe includes a lower ring section and an upper ring section respectively sized to fit around a circumference of the pipe on opposite sides of the weld to be repaired. A plurality of grippers are fit into aligned gripper slots in the lower and upper ring sections. The grippers include a double-tapered outer surface defining cam surfaces shaped to drive the grippers radially inward as the lower and upper ring sections are drawn toward each other by a plurality of connector bolts secured between the lower ring section and the upper ring section.

In yet another exemplary embodiment of the invention, a method of repairing a weld connection in a jet pump diffuser includes the steps of forming pockets in an exterior surface of the diffuser on opposite sides of the weld to be repaired; fitting a plurality of grippers into a corresponding plurality of aligned gripper slots in the lower ring section and the upper ring section, wherein at least one of the gripper slots and the grippers defines cam surfaces shaped to drive the grippers radially inward as the lower and upper ring sections are drawn toward each other; placing the lower ring section and the upper ring section around a circumference of the diffuser on opposite sides of the weld, respectively, with lugs on the grippers engaging the pockets; and tightening connector bolts secured between the lower ring section and the upper ring section to draw the lower and upper ring sections toward each other.

BRIEF DESCRIPTION OF THE DRAWINGS

FIG. 5 is a close-up view of the DF-3 weld gripper engagement;

FIG. 6 is a close-up view of the DF-2 weld gripper engagement; and

DETAILED DESCRIPTION OF THE INVENTION

The jet pump diffuser repair described herein structurally replaces any one of the DF-3 or DF-2 welds. This will provide for the required vertical and lateral support of the diffuser assembly, even if complete failure of one of these welds occurs. The design of the repair assumes that other welds in the diffuser assembly remain intact (welds connecting collar/shell/tail pipe) and other components of the jet pump assembly as well. Thus, it is preferably preferable that the installation of only one jet pump diffuser repair is permitted on any jet pump pair. The estimated design life of the diffuser repair clamp is 40 years.

Figure 1:
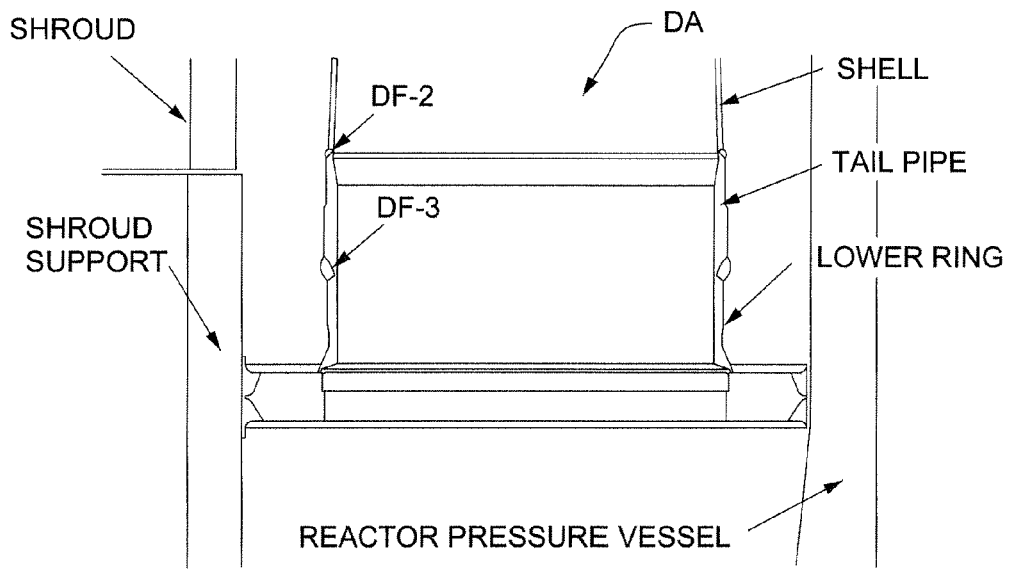
FIG. 1 illustrates the components of the bottom end of a typical jet pump diffuser and weld locations.
Figure 2:
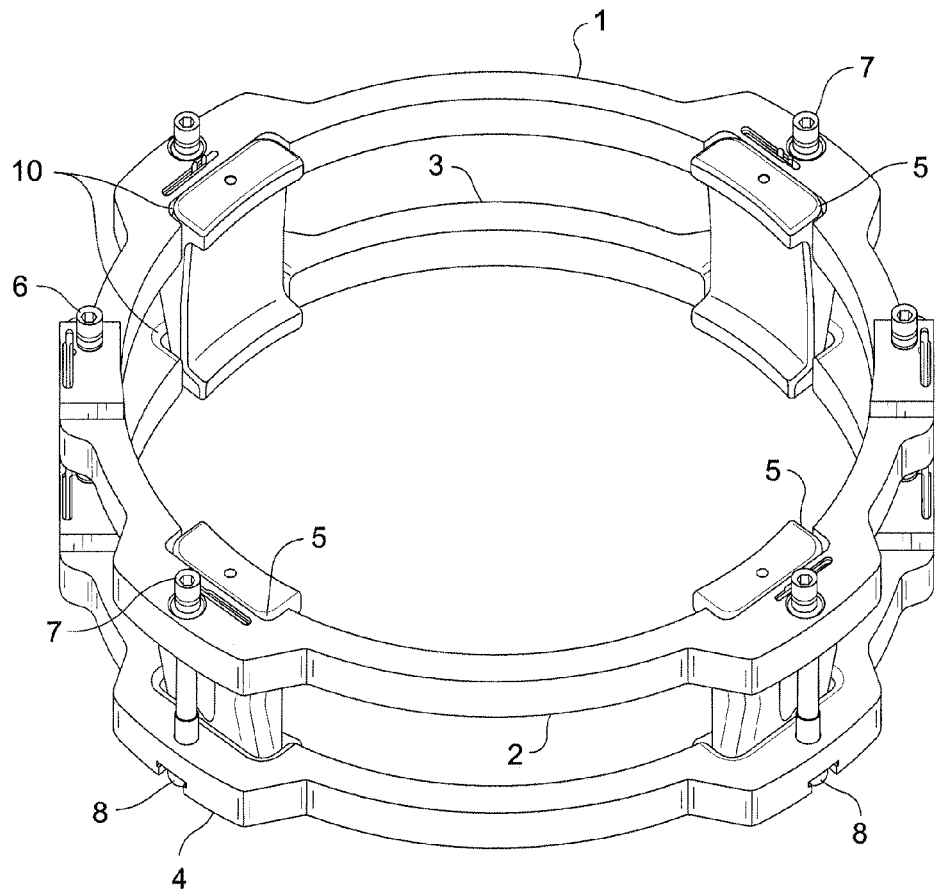
FIG. 2 is a perspective view of the repair device.
Figure 7:
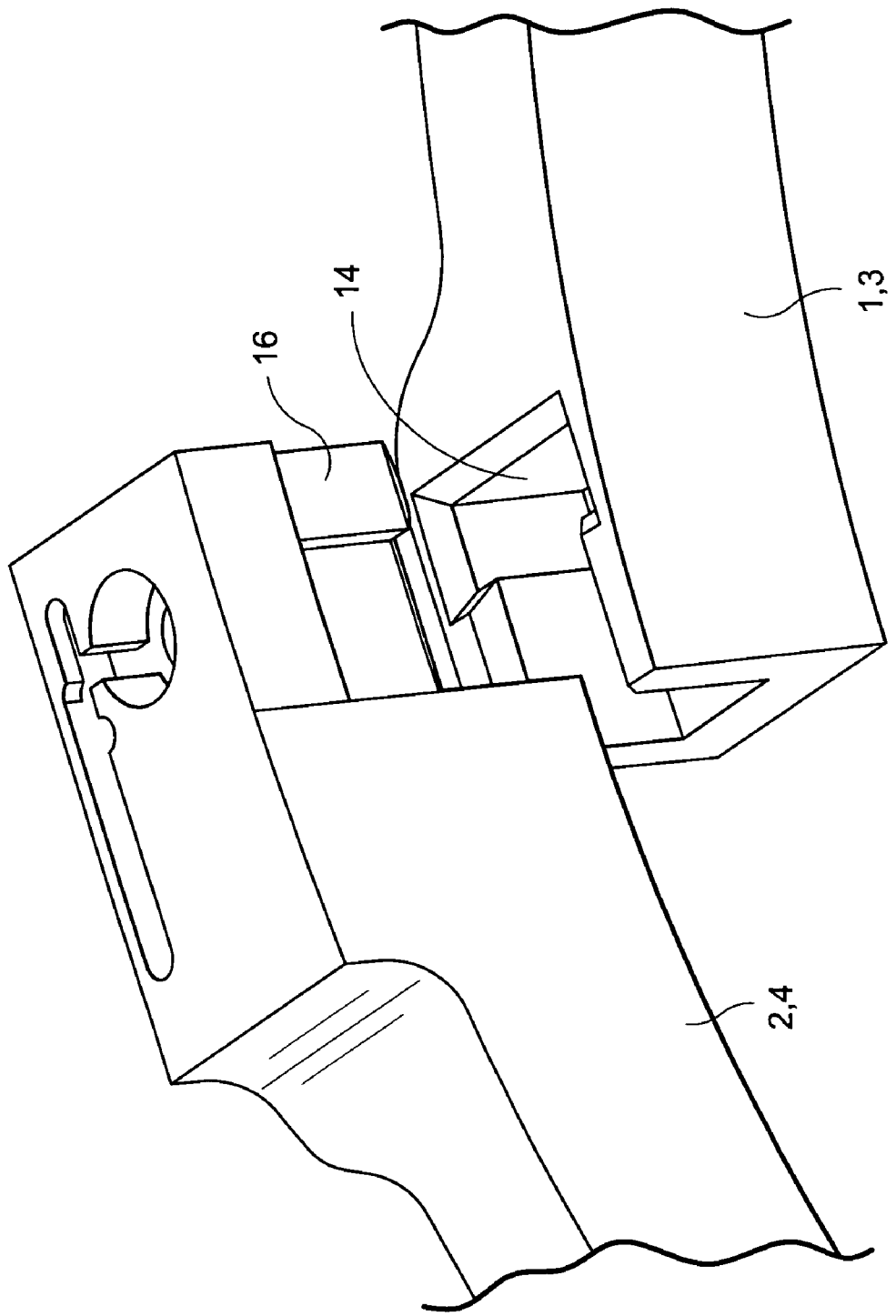
FIG. 7 illustrates an exemplary clamp half connection.

With reference to FIG. 2, a lower ring section includes a clamp half lower female 3 and a clamp half lower male 4 bolted together using two connector bolts 6. The upper ring section includes a clamp half upper female 1 and a clamp half upper male 2 bolted together using two connector bolts 6. The female clamp half connections contain T-slots 14 or other suitable structure into which the corresponding T's 16 or the like on the male clamp halves are inserted (see FIG. 7). This connection takes the hoop loads in the assembly clamp rings so that the connector bolts 6 are only loaded axially, which allows the size of the connector bolts 6 to be minimized since they only experience the axial load due to connector bolt torquing. No shear loads are transmitted through the connector bolts 6. This feature also aligns the bolt holes on the male clamp halves with threaded holes in the female clamp halves to help facilitate the remote installation of the connector bolts.

A plurality of grippers 5 fit into aligned slots 10 in the clamp halves 1-4. The grippers 5 have a 10° taper 5a, 5b on the surface that contacts the clamp halves 1-4. The clamp half slots 10 have a matching 10° angle on the gripper contact surfaces.

Figure 3:
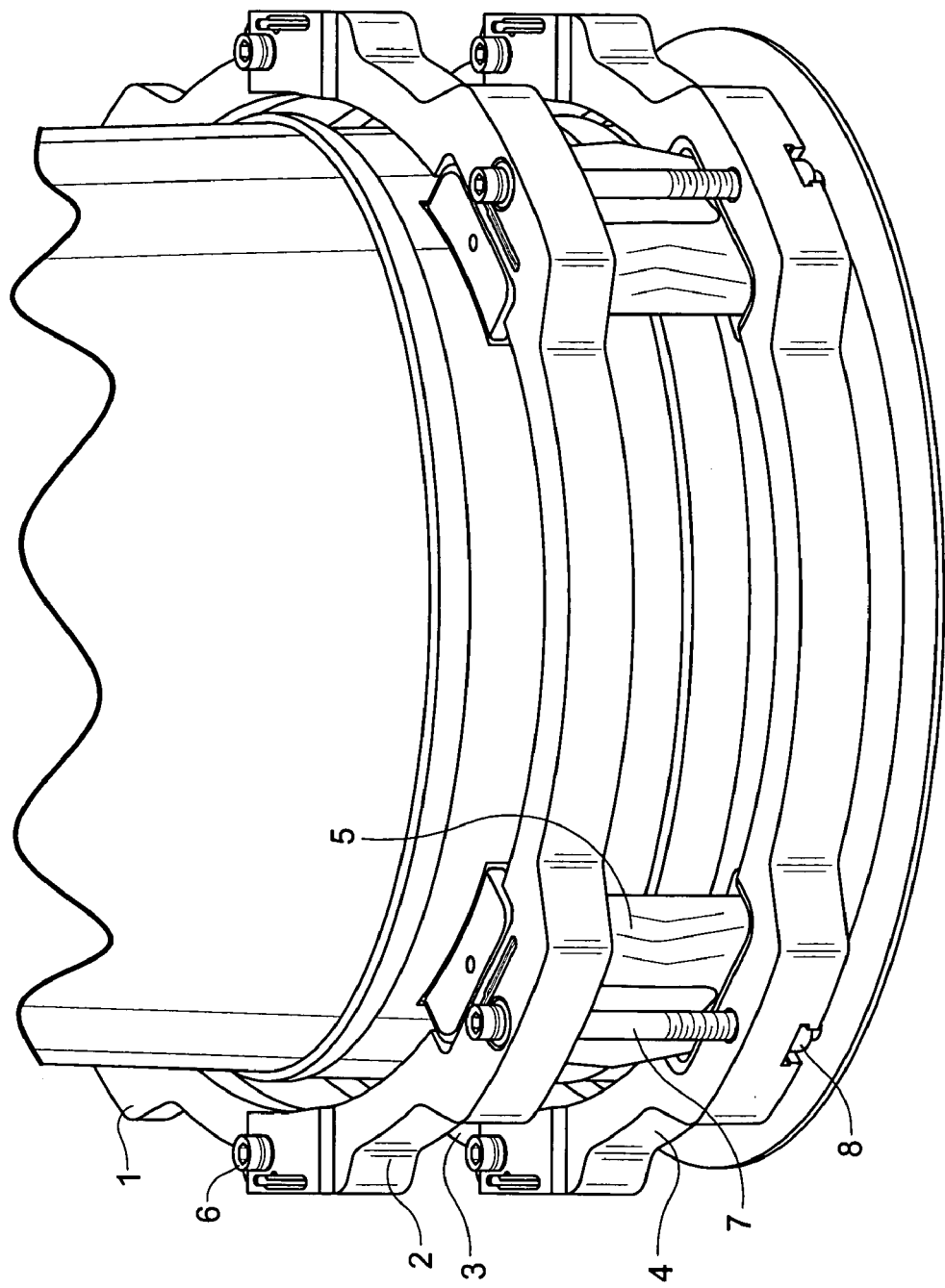
FIG. 3 illustrates the repair device installed on the DF-3 weld.
Figure 4:
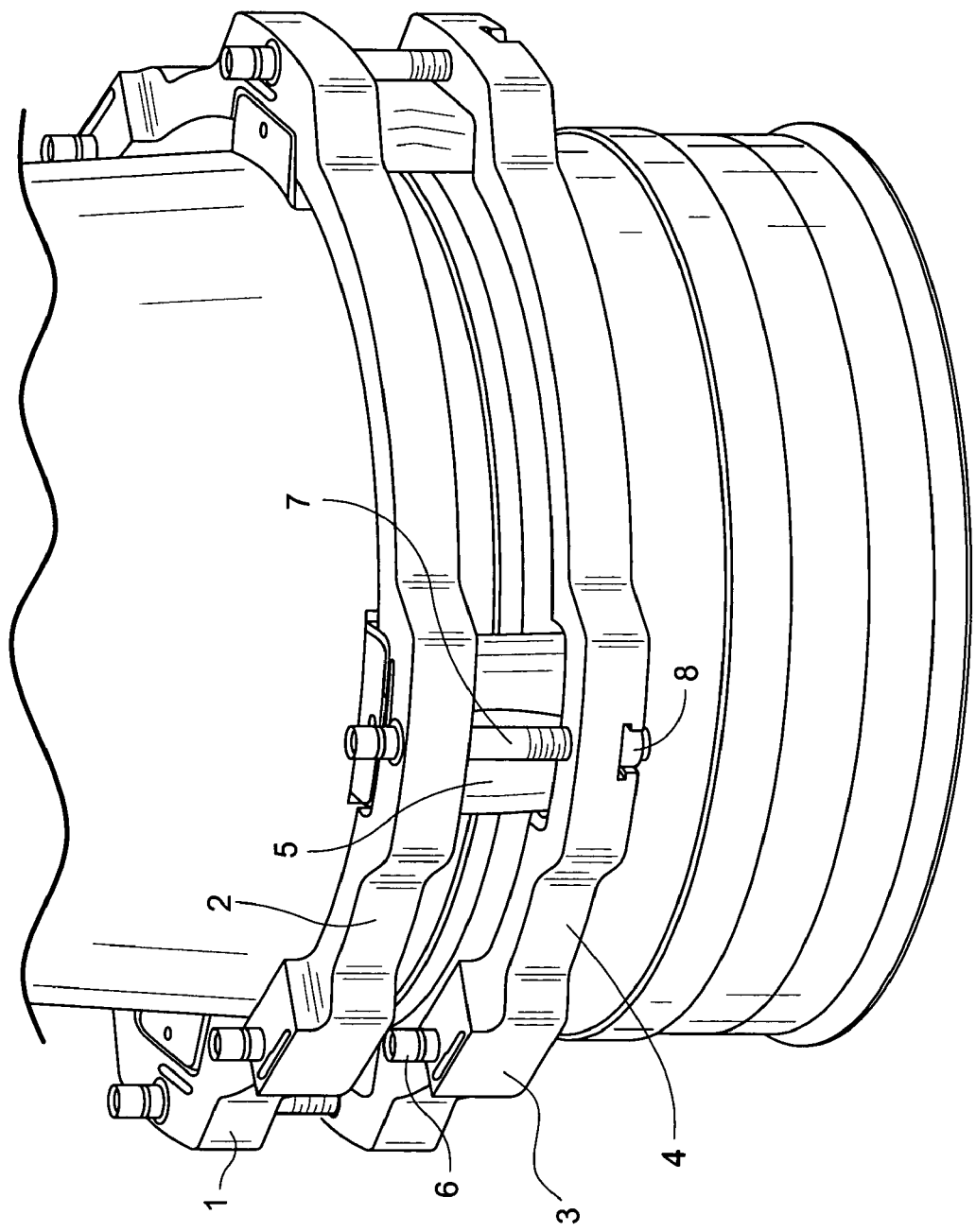
FIG. 4 illustrates the repair device installed on the DF-2 weld.

The upper and lower clamp rings 1-4 are joined using guide bolts 7 and nuts 8. The guide bolts 7 and nuts 8 have spherical surfaces where they contact the clamp halves 1-4, which facilitate assembly when the upper and lower clamp rings are not perfectly parallel to each other. Torquing the guide bolts 7 draws the upper and lower clamp rings 1-4 toward each other, which forces the grippers 5 radially inward. This presses engaging lugs 5c of the grippers 5 into pockets 12 machined into the jet pump diffuser (see FIGS. 5 and 6). The grippers 5 bear against the jet pump diffuser pockets 12 providing a positive connection across the weld being repaired. FIG. 3 illustrates the repair device installed on the DF-3 weld. FIG. 4 illustrates the repair device installed on the DF-2 weld.

The shallow 100 tapers between the grippers 5 and the clamp half slots 10 and the grippers 5 and the jet pump diffuser pockets 12 provide a mechanical advantage in the clamp tightening mode and prevent the applied loads across the welds from being transmitted radially outward into the clamp halves 1-4 during the plant operating transients where the applied loads exceed the clamping load. This is important because the applied loads on the jet pump diffuser during a Loss-of-Coolant-Accident are quite large, and if the repair clamp rings had to be able to accommodate a radial component resulting from those loads, the size of the clamp rings would have to be significantly increased. This could potentially make the repair impossible to install due to the access and space limitations in the annulus surrounding the jet pump diffusers.

With continued reference to FIG. 5, the DF-3 weld repair spans the transition from Alloy 600 to Type 304 material. The lower ring below the weld is Alloy 600 and tail pipe above the weld is Type 304. Type XM-19 material is used for the gripper for strength reasons and to address the different thermal expansion rates of Alloy 600 and Type 304 material. Since the value of the coefficient of thermal expansion for Type XM-19 lies between the values for Alloy 600 and Type 304, it is possible to select pocket locations above and below the weld that result in no relative differential expansion between the clamp and the jet pump. This prevents both excessive loosening and tightening. As long as the length of Alloy 600 material is 0.388 times the length of the Type 304 material (which was derived from a differential expansion evaluation performed for the design), there is no net differential expansion between the repair and the jet pump diffuser.

As shown in FIG. 6, the DF-2 weld repair spans the transition from the tail pipe to the shell. While there is no material change at this location, there is a change in wall thickness and angle. The jet pump contour changes from a vertical cylinder to a slightly angled conical shape. The wall thickness changes from around 0.38" to 0.25". The 0.25" thickness is too thin to support a single pocket of the necessary depth. Thus, the diffuser pockets 12 are machined as multiple shallow grooves for the DF-2 weld.

The repair location is near the bottom of the shroud to vessel annulus. The available space in this region is very limited. Also, the jet pump sensing lines and jet pump riser restrict access to this region. The space and access restrictions at the location of the repair require that the repair be installed in pieces and assembled in place on the jet pump diffuser. When the guide bolts 7 are tightened, the upper and lower clamp rings 1-4 are drawn toward each other, and the tapered slots 10 on the clamp rings push the double-tapered outside surface of the grippers 5 inward against the jet pump diffuser. The grippers 5 engage pockets 12 machined in the tail pipe and the lower ring preferably by remote Electrical Discharged Machining (EDM). This engagement provides a positive connection that controls the separation of the diffuser at the crack location. All bolting is retained by ratchet type locking springs that prevent counterclockwise rotation. Future removal of the repair is possible by reversing the installation sequence. The locking springs will be unlocked remotely using a tool that displaces the ratchet spring and disengages the ratchet teeth from the interfacing teeth on the clamp bolt. Also, all bolting is oriented vertically in order to improve the installation access.

If the alloy 600 diffuser surfaces that are machined by the EDM process are not polished, the repair life may be limited, such as limited to two fuel cycles. The installation of the jet pump diffuser repair will not affect the operation or performance of the jet pump assembly.

One advantage of this repair over the tie rod style repair is that it does not require machining holes through the core support plate. This is beneficial since any holes in the shroud support plate would have to be plugged after the tie rod repair is removed. These plugs would require periodic inspection throughout the remaining life of the plant, which would add expense and outage time.

Detailed structural analysis has been performed on this repair design. Detailed finite element analysis modes have been created and used to determine the stresses for all applicable plant operating conditions. The repair has been shown to meet all of the applicable stress limit criteria. The affect of the repair on the stiffness of the jet pump has been evaluated. It has been determined that in some instances, the use of a jet pump slip joint clamp is required to meet jet pump slip joint flow-induced vibration criteria.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A jet pump diffuser weld repair device operable on a jet pump diffuser including pockets formed in an exterior surface of the diffuser on opposite sides of a weld to be repaired, the weld repair device comprising:

a lower ring section and an upper ring section respectively sized to fit entirely around a circumference of the diffuser on opposite sides of the weld to be repaired, the lower and upper ring sections including a plurality of aligned gripper slots formed in an inner circumference of the lower and upper ring sections;

a corresponding plurality of grippers fit into the gripper slots and facing radially inward toward the diffuser, wherein the grippers comprise double-tapered cam surfaces respectively engaging the lower ring section and the upper ring section, the double-tapered cam surfaces being tapered radially outward from axially distal ends of the grippers toward a central apex to drive the grippers radially inward as the lower and upper ring sections are drawn toward each other; and a plurality of connector bolts secured between the lower ring section and the upper ring section, wherein tightening the connector bolts draws the lower and upper ring sections toward each other, wherein the grippers comprise engaging lugs shaped to fit in the pockets formed on the opposite sides of the weld.

2. A jet pump diffuser weld repair device according to claim 1, wherein the grippers comprise tapered surfaces as the cam surfaces on a side of the grippers facing the gripper slots.

3. A jet pump diffuser weld repair device according to claim 2, wherein the gripper slots comprise angled surfaces as the cam surfaces engaging the tapered surfaces of the grippers.

4. A jet pump diffuser weld repair device according to claim 1, wherein the lower ring section comprises a clamp half lower female part engageable with a clamp half lower male part, and wherein the upper ring section comprises a clamp half upper female part engageable with a clamp half upper male part.

5. A jet pump diffuser weld repair device according to claim 4, wherein the clamp half lower and upper female parts comprise T-slots that receive corresponding T connectors on the clamp half lower and upper male parts.

6. A jet pump diffuser weld repair device according to claim 1, wherein if the opposite sides of the weld in the diffuser exterior surface in which the pockets are formed are of different materials, a material of the grippers is selected such that its coefficient of thermal expansion falls between coefficients of thermal expansion of the different materials.

7. A weld repair device for a thin wall welded pipe comprising:

a lower ring section and an upper ring section respectively sized to fit entirely around a circumference of the thin wall welded pipe on opposite sides of a weld to be repaired;

a plurality of grippers fit into aligned gripper slots formed in an inner circumference of the lower and upper ring sections, the plurality of grippers facing radially inward toward the thin wall welded pipe, wherein the grippers include double-tapered cam surfaces respectively engaging the lower ring section and the upper ring section, the double-tapered cam surfaces being tapered radially outward from axially distal ends of the grippers toward a central apex to drive the grippers radially inward as the lower and upper ring sections are drawn toward each other; and a plurality of connector bolts secured between the lower ring section and the upper ring section, wherein tightening the connector bolts draws the lower and upper ring sections toward each other.

8. A weld repair device according to claim 7, wherein the opposite sides of the weld comprise different materials, and wherein a material of the grippers is selected such that its coefficient of thermal expansion falls between coefficients of thermal expansion of the different materials.

9. A weld repair device according to claim 7, wherein the pipe on one side of the weld is cylindrical and on an opposite side of the weld is conical constituting a shape change, the lower and upper ring sections and the grippers being configured accommodate the shape change.

10. A weld repair device according to claim 7, wherein the grippers comprise engaging lugs shaped to fit in pockets formed in an exterior surface of the thin wall welded pipe on the opposite sides of the weld.

\* \* \* \* \*

UNITED STATES PATENT AND TRADEMARK OFFICE
CERTIFICATE OF CORRECTION

PATENT NO. : 8,335,292 B2
APPLICATION NO. : 11/583062
DATED : December 18, 2012
INVENTOR(S) : Koepke Page 1 of 1

It is certified that error appears in the above-identified patent and that said Letters Patent is hereby corrected as shown below:

At column 2, line 64, delete "preferably" before --preferable--

At column 3, line 35, delete "100 tapers" and insert --10° tapers--

Signed and Sealed this
Twelfth Day of February, 2013

Teresa Stanek Rea
*Acting Director of the United States Patent and Trademark Office*